United States Patent
Karimibiuki et al.

(10) Patent No.: US 12,500,925 B2
(45) Date of Patent: Dec. 16, 2025

(54) FUZZ TESTING OF MACHINE LEARNING MODELS TO DETECT MALICIOUS ACTIVITY ON A COMPUTER

(71) Applicant: SOPHOS LIMITED, Abingdon (GB)

(72) Inventors: Mehdi Karimibiuki, Vancouver (CA); Craig Paradis, Burlington, MA (US)

(73) Assignee: Sophos Limited, Abingdon (GB)

( * ) Notice: Subject to any disclaimer, the term of this patent is extended or adjusted under 35 U.S.C. 154(b) by 366 days.

(21) Appl. No.: 17/710,460

(22) Filed: Mar. 31, 2022

(65) Prior Publication Data

US 2023/0319099 A1    Oct. 5, 2023

(51) Int. Cl.
*H04L 9/40* (2022.01)
*G06F 21/56* (2013.01)
*H04L 41/16* (2022.01)

(52) U.S. Cl.
CPC .......... *H04L 63/145* (2013.01); *G06F 21/566* (2013.01); *H04L 41/16* (2013.01); *H04L 63/1416* (2013.01)

(58) Field of Classification Search
CPC ............ G06F 11/3672; G06F 11/3684; G06F 11/3688; G06F 21/566; G06F 21/577; G06F 2221/033; H04L 63/1416; H04L 63/145; H04L 63/1433; H04L 41/16; G06N 3/045; G06N 3/08; G06N 20/00
See application file for complete search history.

(56) References Cited

U.S. PATENT DOCUMENTS

| | | | |
|---|---|---|---|
| 11,455,524 B1* | 9/2022 | Sanchez | G06N 3/08 |
| 11,762,950 B1* | 9/2023 | Stupp | G06F 18/22 706/12 |
| 2018/0293501 A1* | 10/2018 | Ambati | G06N 20/20 |
| 2018/0365139 A1* | 12/2018 | Rajpal | G06N 5/01 |
| 2019/0215329 A1* | 7/2019 | Levy | G06N 20/00 |
| 2022/0094709 A1* | 3/2022 | Sharma | G06F 18/217 |
| 2022/0237520 A1* | 7/2022 | Wang | G06N 20/00 |
| 2023/0036159 A1* | 2/2023 | Duppils | G06N 3/047 |

(Continued)

OTHER PUBLICATIONS

"Combined Search Report under Section 17(5) (b) and Abbreviated Examination Report Under Section 18(3)", Oct. 6, 2023, 4 pages.

(Continued)

*Primary Examiner* — Jeremy S Duffield
(74) *Attorney, Agent, or Firm* — IP Spring (57) ABSTRACT

An example method can include, obtaining information about a machine learning (ML) model configured to detect malicious activity on a computer system, wherein the information includes one or more of a model type of the ML model, an output type of the ML model, or a type of malicious activity that the model is trained to detect, receiving a training dataset, wherein the training dataset includes a plurality of unlabeled examples, generating an additional dataset based on the training dataset using a generative model, wherein the additional dataset includes a plurality of additional unlabeled examples, and, training the machine learning model to generate labels for each example in the training dataset and the additional dataset, using a combination of the training dataset and the additional dataset, wherein the training includes adjusting one or more parameters of the machine learning model based on accuracy of the generated labels.

20 Claims, 6 Drawing Sheets

(56) References Cited

U.S. PATENT DOCUMENTS

| | | | | |
|---|---|---|---|---|
| 2023/0113733 A1* | 4/2023 | Suneja | ............ | G06F 8/4435 717/151 |
| 2023/0205880 A1* | 6/2023 | Ulasen | ............ | G06F 21/53 726/23 |
| 2023/0281310 A1* | 9/2023 | Chen | ............ | G06N 3/0475 726/24 |

OTHER PUBLICATIONS

Anderson, "The Practical Divide Between Adversarial ML Research and Security Practice: a Red Team Perspective", https://www.usenix.org/conference/enigma2021/presentation/anderson, Feb. 2, 2021.
Carlini, et al., "Poisoning and Backdooring Contrastive Learning", arXiv:2106.09667v2 [cs.LG], Mar. 28, 2022, 13 pages.
Carlini, "Poisoning the Unlabeled Dataset of Semi-Supervised Learning", arXiv:2105.01622v2 [cs.LG], Aug. 10, 2021, 16 Pages.
Carlini, "Poisoning the Unlabeled Dataset of Semi-Supervised Learning", https://www.usenix.org/conference/usenixsecurity21/presentation/carlini-poisoning, Aug. 11-13, 2021, 17 pages.
Chen, et al., "Robust Out-of-distribution Detection for Neural Networks", arXiv:2003.09711v6 [cs.LG], Dec. 9, 2021, 10 pages.
Huang, et al., "MetaPoison: Practical General-purpose Clean-label Data Poisoning", arXiv.2004.00225v2 [cs.LG], Feb. 21, 2021, 23 pages.
Odena, et al., "TensorFuzz: Debugging Neural Networks with Coverage-Guided Fuzzing", arXiv:18075v1 [Stat.ML], Jul. 28, 2018, 12 pages.
Xiao, et al., "Self-Checking Deep Neural Networks in Deployment", arXiv.2103.02371v1 [cs.SE], Mar. 3, 2021, 13 pages.
Yang, et al., "CADE: Detecting and Explaining Concept Drift Samples for Security Applications", https://www.usenix.org/conference/usenixsecurity21/presentation/yang-limin, Aug. 11-13, 2021, 19 pages.
"Examination Report Under Section 18(3) in GB Application No. 2304691.5", Mar. 4, 2025, 3 pages.
Y Wang, et al., "A systematic review of fuzzing based on machine learning techniques", PloS one 15.8 (2020): e0237749; https://journals.plos.org/plosone/article/file?id=10/1371/journal.pone.0237749&type=printable, 20 pages.
"Search Report Under Section 17 in GB Application No. 2304691.5", 1 pages, Feb. 28, 2025.

* cited by examiner

FUZZ TESTING OF MACHINE LEARNING MODELS TO DETECT MALICIOUS ACTIVITY ON A COMPUTER

TECHNICAL FIELD

Embodiments relate generally to software threat management, and more particularly, to methods, systems, and computer readable media for fuzz testing of machine learning models.

BACKGROUND

With continually evolving computer security threats, there remains a need for automated, semi-automated, and manual techniques to identify security threats and vulnerabilities in machine learning models.

SUMMARY

Implementations of this application relate to methods, systems, and computer readable media for fuzz testing of machine learning models.

According to one aspect, a computer-implemented method to train a machine learning model to detect malicious activity on a computer system is provided. The computer-implemented method can include obtaining information about the machine learning (ML) model. The information includes one or more of a model type of the ML model, an output type of the ML model, or a type of malicious activity that the model is trained to detect. The computer-implemented method can also include receiving a training dataset. The training dataset includes a plurality of unlabeled examples. The computer-implemented method can also include generating an additional dataset based on the training dataset using a generative model. The additional dataset includes a plurality of additional unlabeled examples. The computer-implemented method can also include training the machine learning model to generate labels for each example in the training dataset and the additional dataset, using a combination of the training dataset and the additional dataset. The training includes adjusting one or more parameters of the machine learning model based on accuracy of the generated labels.

In some implementations, generating the additional dataset that includes the plurality of additional examples is based on mutating one or more unlabeled examples of the training dataset using the generative model.

In some implementations, the training dataset further includes a plurality of labeled examples, each labeled example associated with a groundtruth label and the accuracy of the generated labels is evaluated based on a comparison of corresponding groundtruth labels for each labeled example. The groundtruth label is not provided as input to the ML model.

In some implementations, the computer-implemented method further includes determining a statistical distribution of the training dataset. The additional dataset has a statistical distribution different than the statistical distribution of the training dataset.

In some implementations, the computer-implemented method further includes, after the training, detecting the malicious activity using the trained ML model based on input examples from the computer system. The trained model obtains a plurality of features from each input example and generates one or more labels for each input example based on the plurality of features. The computer-implemented method further includes detecting that a statistical distribution of the plurality of features of the input examples is different from a statistical distribution of the training dataset. The detecting is based on the plurality of features obtained from each input example. The computer-implemented method further includes, in response to the detecting that the statistical distribution is different, retraining the model using one or more of the input examples as input.

In some implementations, the computer-implemented method further includes, after the training, detecting the malicious activity using the trained ML model based on input examples from the computer system, detecting that a generated label associated with a subset of the input examples is different from a corresponding groundtruth label, and in response to the detecting that the generated label is different, retraining the model using subset of the input examples as input.

In some implementations, the plurality of unlabeled examples includes data from the computer system, wherein the data includes an executable program that runs on the computer system.

In some implementations, training the machine learning model to generate labels includes training the machine learning model to classify the executable program as one or more of trojan, virus, worm, backdoor, or adware.

According to another aspect, a computer program product is provided. The computer program product can include one or more non-transitory computer-readable media with instructions stored thereon that, responsive to execution by one or more processing devices, cause the one or more processing devices to perform operations. The operations can include obtaining information about a machine learning (ML) model configured to detect malicious activity on a computer system. The information includes one or more of a model type of the ML model, an output type of the ML model, or a type of malicious activity that the model is trained to detect. The operations further include receiving a training dataset. The training dataset includes a plurality of unlabeled examples. The operations can also include generating an additional dataset based on the training dataset using a generative model. The additional dataset includes a plurality of additional unlabeled examples. The operations can also include training the machine learning model to generate labels for each example in the training dataset and the additional dataset, using a combination of the training dataset and the additional dataset. The training includes adjusting one or more parameters of the machine learning model based on accuracy of the generated labels.

In some implementations, generating the additional dataset that includes the plurality of additional examples is based on mutating one or more unlabeled examples of the training dataset using the generative model.

In some implementations, the training dataset further includes a plurality of labeled examples, each labeled example associated with a groundtruth label and the accuracy of the generated labels is evaluated based on a comparison of corresponding groundtruth labels for each labeled example. The groundtruth label is not provided as input to the ML model.

In some implementations, the operations further include determining a statistical distribution of the training dataset. The additional dataset has a statistical distribution different than the statistical distribution of the training dataset.

In some implementations, the operations further include, after the training, detecting the malicious activity using the trained ML model based on input examples from the computer system. The trained model obtains a plurality of features from each input example and generates one or more labels for each input example based on the plurality of features. The operations further include detecting that a statistical distribution of the plurality of features of the input examples is different from a statistical distribution of the training dataset. The detecting is based on the plurality of features obtained from each input example. The operations further include, in response to the detecting that the statistical distribution is different, retraining the model using one or more of the input examples as input.

In some implementations, the operations further include, after the training, detecting the malicious activity using the trained ML model based on input examples from the computer system, detecting that a generated label associated with a subset of the input examples is different from a corresponding groundtruth label, and in response to the detecting that the generated label is different, retraining the model using subset of the input examples as input.

In some implementations, the plurality of unlabeled examples include data from the computer system. The data includes an executable program that runs on the computer system.

In some implementations, training the machine learning model to generate labels includes training the machine learning model to classify the executable program as one or more of trojan, virus, worm, backdoor, or adware.

According to another aspect, a threat management computer system to manage security threats on an enterprise network is provided. The threat management computer system can include a memory with instructions stored thereon, one or more processing devices, coupled to the memory, the one or more processing devices configured to access the memory and execute the instructions, and one or more network devices coupled to the one or more processing devices and configured to receive requests issued by a plurality of client devices. The instructions cause the one or more processing devices to perform operations including obtaining information about a machine learning (ML) model configured to detect malicious activity on a second computer system associated with the enterprise network. The information includes one or more of a model type of the ML model, an output type of the ML model, or a type of malicious activity that the model is trained to detect. The operations can also include receiving a training dataset. The training dataset includes a plurality of unlabeled examples. The operations can also include generating an additional dataset based on the training dataset using a generative model. The additional dataset includes a plurality of additional unlabeled examples. The operations can also include training the machine learning model to generate labels for each example in the training dataset and the additional dataset, using a combination of the training dataset and the additional dataset. The training includes adjusting one or more parameters of the machine learning model based on accuracy of the generated labels.

In some implementations, generating the additional dataset that includes the plurality of additional examples is based on mutating one or more unlabeled examples of the training dataset using the generative model.

In some implementations, the training dataset further includes a plurality of labeled examples, each labeled example associated with a groundtruth label and the accuracy of the generated labels is evaluated based on a comparison of corresponding groundtruth labels for each labeled example. The groundtruth label is not provided as input to the ML model.

In some implementations, the operations further include determining a statistical distribution of the training dataset. The additional dataset has a statistical distribution different than the statistical distribution of the training dataset.

According to yet another aspect, portions, features, and implementation details of the systems, methods, non-transitory computer-readable media, and computer program products may be combined to form additional aspects, including some aspects which omit and/or modify some or portions of individual components or features, include additional components or features, and/or other modifications; and all such modifications are within the scope of this disclosure.

DETAILED DESCRIPTION

Fuzz testing, also referred to as fuzzing, is a software testing technique which uses a fuzzer to find implementation bugs using injection of generated test data, such as malformed or semi-malformed data, in an automated fashion. A fuzzer is a computer program which automatically injects different data into a program/stack to detect software bugs. The injected data can be based on automated data generators, and vulnerability identification can rely on debugging tools. Data generators usually use combinations of static fuzzing vectors (e.g., known-to-be-dangerous values), generation or modification of test data according to patterns or rules, or random data. Some fuzzers may use genetic algorithms to link injected data and observed impact of the tested software (e.g., target software). However, many fuzzers lack the ability to fuzz test machine learning models.

For example, the widespread adoption of artificial intelligence (AI) machines in detecting malware (e.g., spam, phishing, adware, trojans, etc.), raises questions about their output (classification) trustworthiness. Even a highly accurate AI system will make mistakes some of the time, and in attack scenarios involving zero-day attacks, trojans, logical bombs, or malicious code, these mistakes must quickly be detected and remediated. However, available software fuzzing tools are configured to bombard target software with a set of extreme and/or invalid inputs to discover unknown vulnerabilities, but are generally not applicable to machine learning models. For example, machine learning models are difficult to interpret and debug, and verification of machine learning models is a computationally expensive exercise, particularly when attempting to locate a root cause of errors or vulnerabilities.

As described herein, fuzz testing of machine learning models includes a process by which mutated data are created to measure the trustworthiness of an AI or machine learning model by observing the resulting predictions. Accordingly, one or more implementations described herein relate to fuzz testing of machine learning models, determining and/or generating appropriate input datasets for the fuzz testing, training and retraining of machine learning models using the appropriate input datasets, and correcting or minimizing software threats based on the fuzz testing of machine learning models.

The below detailed description is presented in reference to these and other scenarios where software developers can benefit from automatic fuzz testing of machine learning models, and/or from identifying potential security threats prior to software exhibition or delivery.

Figure 1:
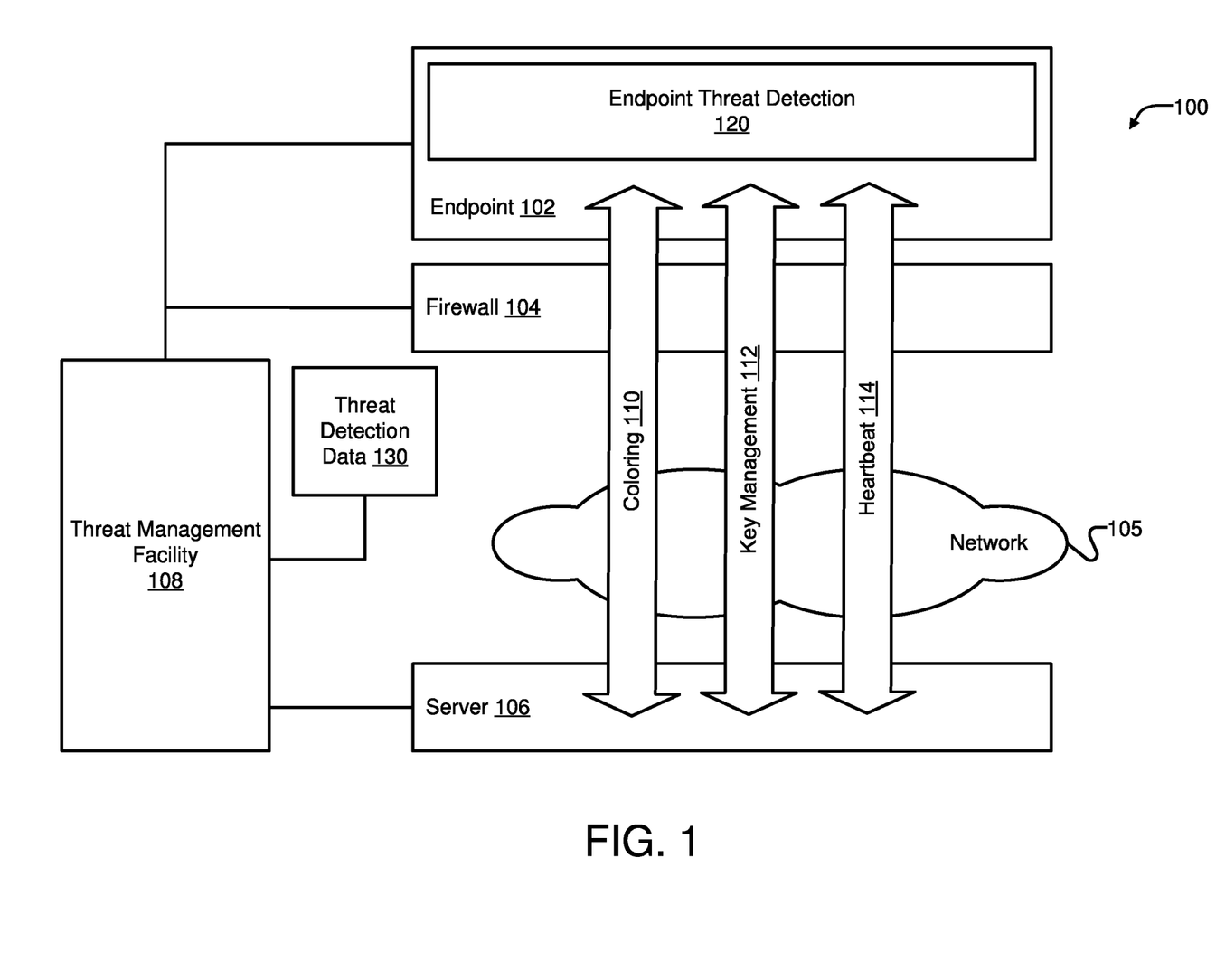
FIG. 1 is a block diagram of an example enterprise network threat management system, in accordance with some implementations.

FIG. 1 illustrates a threat management system according to some implementations. In general, the system 100 may include an endpoint 102, a firewall 104, a server 106 and a threat management facility 108 coupled to one another directly or indirectly through a data network 105. Each of the entities depicted in FIG. 1 may, for example, be implemented on one or more computing devices such as the computing device described below with reference to FIG. 6. A number of systems may be distributed across these various components to support threat detection, such as a coloring system 110, a key management system 112, and a heartbeat system 114 (or otherwise an endpoint health system), each of which may include software components executing on any of the foregoing system components, and each of which may communicate with the threat management facility 108 and an endpoint threat detection agent 120 executing on the endpoint 102 to support improved threat detection and remediation.

The endpoint 102 may, for example, include a desktop or other computing device such as a laptop, tablet mobile device, cellular phone, virtual machine, server, or any other physical or virtual device that might couple to the network 105 to communicate with other devices and endpoints.

In general, the threat management facility 108 may help to secure the endpoint 102 and other devices coupled to an enterprise network against malicious software or other threats such viruses, spyware, adware, trojans, intrusion, spam, phishing explorations, policy abuse, uncontrolled access and the like. Regardless of how it is categorized, the threat may need to be stopped at various points of a networked computing environment, such as the endpoint 102, the firewall 104, the server 106 and/or the threat management facility 108, or any other devices such as laptops, cellular phones, desktops, servers, gateways, communication ports, handheld or mobile devices, firewalls, and the like, and the threat management facility 108 may help to generally coordinate detection and remediation in this context.

In one aspect, this may include email security and control, e.g., where security management may help to eliminate spam, viruses, spyware and phishing, control of email content, and the like. The threat management facility 108 may also help to protect against other inbound and outbound threats, protect email infrastructure, prevent data leakage, provide spam filtering, and the like. The threat management facility may support other security techniques and services such as reporting on suspect devices, security and content filtering, active monitoring of network traffic, URI filtering, network access control, access to virtual private networks (VPN), host intrusion prevention, and so forth.

The system 100 may employ threat detection data 130, such as a threat detection model (e.g., a machine learning model) based on automatic fuzz testing results, logs of tested software, and/or other data, to assist in analyzing software to detect malicious code. The threat detection data 130 may also include machine learning models trained on known malicious software to aid in identifying, isolating, and mitigating threats from malicious software.

In one implementation, the threat detection data 130 includes a machine learning model configured to detect malicious activity on a computer system, such as a networked computer system associated with an enterprise network. According to one implementation, the machine learning model is configured to classify a type of software threat and/or vulnerability. According to one implementation, the machine learning model is configured to classify an executable program, executing or stored on a computer system, as one or more of trojan, virus, worm, backdoor, or adware. The machine learning model may also be configured in other manners associated with detecting, categorizing, classifying, and other suitable manners. Other machine learning models that are not associated with security threats may also be applicable and/or be fuzz tested using the teachings herein.

The coloring system 110 may be used to label or color software objects for improved tracking and detection of potentially harmful activity. The coloring system 110 may, for example, label files, executables, processes, network communications, data sources and so forth with any suitable label. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. A network communication stream may inherit a color from the application that launched it, a machine that communicated it, and so forth. More generally, any type of labeling, as well as rules for propagating, inheriting, changing, or otherwise manipulating such labels, may be used by the coloring system 110 as contemplated herein. A coloring model, alone or in combination with other classifications, detections, or characteristics, may be used to assign one or more colors.

The key management system 112 may support management of keys for the endpoint 102 in order to selectively permit or prevent access to content on the endpoint 102 on a file-specific basis, a process-specific basis, an application-specific basis, a user-specific basis, or any other suitable basis in order to prevent data leakage, and in order to support more fine-grained and immediate control over access to content on the endpoint 102 when a security compromise is detected. Thus, for example, if a particular process executing on the endpoint is compromised, or potentially compromised or otherwise under suspicion, as determined by a model, alone or in combination with other classifications, detections, or characteristics, access by that process may be blocked (e.g., with access to keys revoked) in order to prevent, e.g., data leakage or other malicious activity.

The heartbeat system 114 may be used to provide periodic or aperiodic information from the endpoint 102 or other system components about system health, security, status, and so forth. The heartbeat system 114 or otherwise an endpoint health system may thus in general include a health status report system for the endpoint 102, such as through the use of a heartbeat system or the like. A heartbeat may be encrypted or plaintext, or some combination of these, and may be communicated unidirectionally (e.g., from the endpoint 108 to the threat management facility 108) or bidirectionally (e.g., between the endpoint 102 and the server 106, or any other pair of system components) on any useful schedule. In some implementations, the heartbeat system 114 may be used to securely communicate information about the health status of a device. In some implementations, the heartbeat system 114 may be used to communicate color information or other information (e.g., user information, source information, process information) about files, executables, processes, network communications, data sources and so forth. For example, a firewall 104 may use the heartbeat system 114 to request information from an endpoint 102 about an application associated with a network communication. For example, a firewall 104 may use the heartbeat system 114 to direct an endpoint 102 to take action to manage the endpoint 102 or the system 100 in response to a potential or actual security threat or for administrative purposes. For example, an endpoint 102 may use the heartbeat system 114 to communicate a determination by the endpoint threat detection agent 120 to other network entities or locations. In some implementations, the heartbeat system 114 may be used to communicate fuzzing outputs, such as an output from any of the fuzz testing techniques described herein, either alone or in combination with other classifications, detections, or characteristics, with respect to detections on files, executables, processes, network communications, data sources and so forth.

While the system 100 may be organized as an enterprise threat detection and management system, the same may be varied in many ways. For example, and without limitation, the system 100 may include software development facilities to facilitate the development and automatic fuzz testing of machine learning models. The automatic fuzz testing may be used to update the threat detection data 130, to re-train machine learning models, and/or provide software signatures of pre-tested software to enable monitoring of newly tested/developed software comprising verified machine learning models to ensure only tested/verified models are deployed through the system 100.

For example, in some implementations, a machine learning model may be subjected to automatic fuzz testing, and input data associated with vulnerabilities may be identified. Input data associated with vulnerabilities may be provided to the threat management facility 108. The threat management facility may provide detection data 130 that may be used to recognize the use of input data associated with a vulnerability. The Endpoint Threat Detection 120 may use the detection data 130 to recognize an attempt to apply the input data associated with a vulnerability to an application running on the endpoint. This may result in a threat detection, coloring the application attempting to apply the input data, coloring the application to which the data was applied, and so forth.

For example, in some implementations, a machine learning model tested with the fuzz testing techniques described herein may be deployed in the system 100, for example, on the endpoint 102, as part of endpoint threat detection 120 or otherwise, as part of the firewall 104, in the threat management facility 108, or on the server 106. The use of the fuzz testing techniques makes the machine learning models so tested more robust and secure, contributing to the overall security of system 100.

For example, and turning to FIG. 2, an automatic fuzz testing framework that is deployable in the system 100 is described below.

Figure 2:
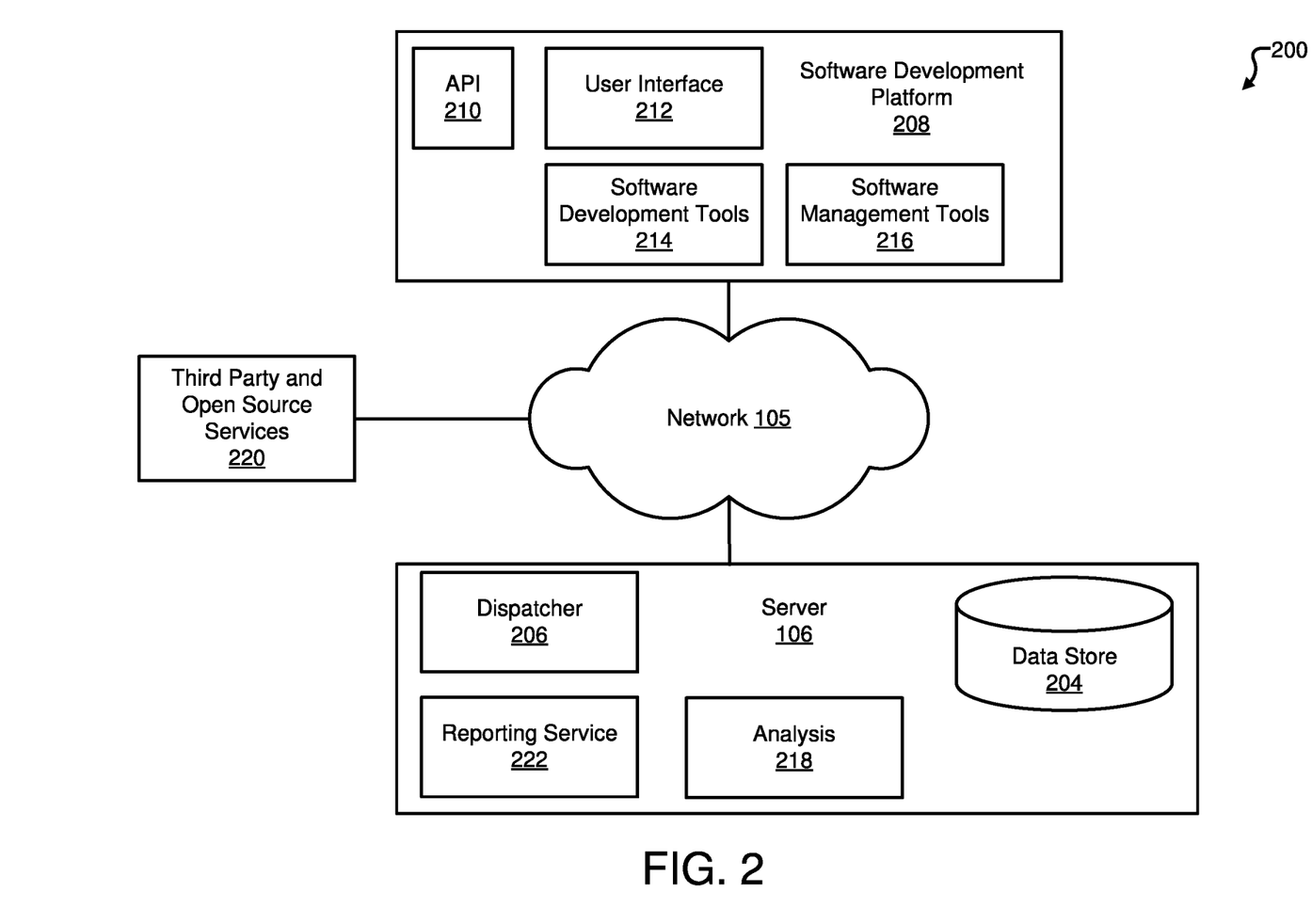
FIG. 2 is a block diagram of an example automatic fuzz testing framework, in accordance with some implementations.

FIG. 2 is a block diagram of an example automatic fuzz testing framework 200, in accordance with some implementations. The framework 200 may also be referred to as a "platform" or "network environment" herein. In general, the framework 200 may include the server 106, a software development platform 208, and third party and open source services 220, coupled to one another directly or indirectly through the data network 105. The platform 208 and services 220 may each be implemented on one or more servers or other suitable computing devices that are coupled to network 105. The platform 208 and the services 220 may, for example, each be implemented on one or more compute instances in a cloud computing infrastructure. Furthermore, each of the entities depicted in FIG. 2 may, for example, be implemented on one or more computing devices such as the computing device described below with reference to FIG. 6.

Framework 200 is provided for illustration. In some implementations, the framework 200 may include the same, fewer, more, or different elements configured in the same or different manner as that shown in FIG. 1 and FIG. 2.

In some implementations, data network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the software development platform 208 can include a server having one or more computing devices (e.g., a cloud computing system, a rackmount server, a server computer, cluster of physical servers, virtual server, etc.). In some implementations, a server may be included in the software development platform 208, be an independent system, or be part of another system or platform.

In some implementations, the software development platform 208 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the software development platform 208 and to provide a user (e.g., a software developer) with access to software development platform 208. The software development platform 208 may also include a website (e.g., one or more web pages) or application back-end software that may be used to provide a user with access to content provided by software development platform 208. For example, users (or developers) may access software development platform 208 using the user interface 212 on a client computing device or a computer access terminal.

In some implementations, software development platform 208 may provide connections between one or more third party service providers and/or enterprise networks that allows developers to communicate with other developers/ employees via the software development platform 208, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "developer" may be represented as a single individual. However, other implementations of the disclosure encompass a "developer" being an entity with a set of users or a group or groups working to develop software. For example, a set of individual users federated as a group may be considered a single "developer," in some circumstances.

In some implementations, software development platform 208 may include software development provisions. For example, the platform may provide interfaces allowing the design, modification, and debugging of software, and other software development functions. In some implementations, a piece of developed software to be tested is referred to as a "target model." The target model may be developed through the software development platform, be tested using the framework 200 for one or more security vulnerabilities, and implemented in a system (e.g., system 100) for deployment and use by an enterprise, individual, or a computer device. For example, the target model may be used in the Endpoint Threat Detection 120 or in the Firewall 104 as a machine learning model configured to detect security threats and/or vulnerabilities.

In general, the software development platform 208 may include various components and features including, for example, application programming interface (API) 210, user interface 212, software development tools 214, and software management tools 216. The software development platform 208 may be an independent system executed on a separate server, or may be included within the server 106. In some implementations, the software development platform 208 may be a distributed platform utilizing any number of computing devices and servers, may be a software-as-a-service platform offering software development utilities on an on-demand or other basis, may be implemented on one or more client or developer computing devices (e.g., as described with reference to FIG. 6), or any combination thereof.

Generally, the API 210 may be organized to include any number of software functions, commands, and/or interfaces configured to allow a software developer access to programming tools. For example, the API 210 may be exposed to a developer through the user interface 212, thereby allowing the developer to create software applications, machine learning models, and components as computer-executable code portions for storage at a non-transitory computer-readable storage medium, and for execution at a suitable computer device. The API 210 may also include multiple APIs, in some implementations.

The user interface 212 may be a graphical user interface configured to present a developer with a computer interface used to create, edit, modify, and deploy machine learning models. In some implementations, the user interface 212 is further configured to allow a developer to establish testing protocols, modify testing parameters, implement testing configuration settings, and/or set testing parameters. In some implementations, the user interface 212 is further configured to present results of automatic fuzz testing for viewing and use by a developer. In some implementations, the user interface 212 is further configured to present a developer with a summary of software vulnerabilities, including in some circumstances example mutated input data causing an error, such that the developer may more easily identify a potential vulnerability in a machine learning model.

The software development tools 214 may include a collection of development tools that may be presented through the user interface 212, for example, to facilitate the development of machine learning models by a developer. The software development tools may include, but are not limited to, one or more software development kit(s), integrated development environment(s), computer-assisted software-engineering (CASE) tool(s), software repository(ies), software source code editor(s), software compiler(s), software profiler(s), and/or other software development tools. In at least one implementation, the software development tools 214 are further configured to allow access, through the user interface 212, to third party and open source services 220, for software creation using these services.

The software management tools 216 may include a collection of management tools or portions of the software development tools described above, that may be presented through the user interface 212, for example, to facilitate the management and testing of machine learning models by a developer. For example, the software management tools 216 may include, but are not limited to one or more runtime environment(s), debugging environment(s), testing environment(s), software repository(ies), virtual machine(s), image(s), and/or other software management tools. In at least one implementation, the software management tools 216 are further configured to allow access, through the user interface 212, to third party and open source services 220, for software management using these services.

In at least one implementation, the software management tools 216 are further configured to facilitate the creation of a machine learning model description. The machine learning model description may be a set of data used to identify features and aspects of a target machine learning model that is to be tested. In one implementation, the machine learning model description is stored and accessible through the software management tools 216 and/or the platform 200. For example, the machine learning model description may include machine learning model information such as one or more of a model type of the machine learning model, an output type of the machine learning model, or a type of malicious activity that the model is trained to detect.

The machine learning model description may also include a description of a path or location that generally indicates a "path" where the artifact (i.e., target model to be fuzzed) is located. The path can be a public site location (e.g., a publicly accessible web address), a repository (e.g., a private or publicly accessible software repository), a directory in a local filesystem, or a copy of the target software can be transmitted directly, for example, in an archive or compressed file format or uncompressed format.

In addition to the machine learning model description, the software development platform 208 may also facilitate the creation of an optional "specification" file that provides a human-readable functional description of the target model to be fuzzed. The specification file may be described in a standard human-readable language, such as, for example, OpenAPI or YAML.

As mentioned briefly above, the third party and open source services 220 may be in operative communication with the software development platform 208 and server 106 over the data network 105. In some implementations, the third party and open source services 220 may include, but are not limited to, software repositories, fuzzer repositories, software testing websites, APIs, and other suitable data sources and services useable in software development.

Generally, the server 106 may include a logical or physical server having one or more computing devices (e.g., a cloud computing system, a rackmount server, a server computer, cluster of physical servers, virtual server, etc.). In some implementations, the server 106 may be an independent system, or be part of another system or platform.

In some implementations, the server 106 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the server 106 and to provide a developer with access to the features and services described above.

Generally, the server 106 may include various components and features including, for example, data store 204, dispatcher 206, analysis service 218, and reporting service 222.

In some implementations, the data store 204 may be a non-transitory computer readable memory (e.g., random access memory), a cache, a drive (e.g., a hard drive), a flash drive, a database system, or another type of component or device capable of storing data. The data store 204 may also include multiple storage components (e.g., multiple drives or multiple databases) that may also span multiple computing devices (e.g., multiple server computers). In some implementations, data store 204 may include cloud-based storage such as dynamic storage or other storage. In some implementations, some or all of the aforementioned stored data may be packaged as a computer program product comprising one or more computer-readable media.

In some implementations, the dispatcher 206 is a component executed through the server 106 and configured to dispatch one or more fuzzers, to create and/or load mutated datasets for testing and analyzing target models. The dispatcher 206 may be configured to load the target model, load the one or more mutated datasets, and direct a fuzzer to test the target model. Furthermore, the dispatcher 206 may further be configured to loop or iterate through various iterations of fuzz testing and direct any results to a logging or data aggregation service, such as reporting service 222.

In some implementations, the analysis service 218 is a component executed through the server 106 and configured to identify the at least one fuzzer that is available and capable of fuzzing using the mutated datasets. For example, the analysis service 218 may be configured to interpret the machine learning model description associated with the target model to determine an appropriate input profile that may be desirable for fuzz testing. The analysis service 218 may attempt to match (or at least partially match or correlate) various input types for the target model to an appropriate form of mutated dataset. Thereafter, the analysis service 218 may transmit the analysis of the target model to the dispatcher 206 such that the dispatcher 206 may appropriately dispatch a mutated dataset for fuzz testing of the target model.

Upon dispatching and testing the target model by both the analysis service 218 and the dispatcher 206, the reporting service may aggregate a report of testing results. For example, in some implementations, the reporting service 222 may be a component executed through the server 106 and configured to aggregate results from the one or more mutated datasets based on testing of the target model. The reporting service 222 may also be configured to prioritize results for better display to developers, such that a holistic view of the software testing is presented through a user interface (e.g., user interface 212).

In at least one implementation, the reporting service 222 may categorize vulnerabilities that are identified into different groupings such as errors (e.g., misclassifications, etc.), failures, and/or other groupings. These categorized vulnerabilities may be further organized and normalized such that similar defects are presented in a meaningful manner to a developer. For example, severe software vulnerabilities may be categorized and presented first. Similarly, less severe software vulnerabilities may be categorized and presented after more severe vulnerabilities. Additionally, although described as prioritized and/or normalized, raw data results may also be organized by the reporting service 222 and stored at the data store 204 in unedited form. In this manner, other forms of abstraction may be performed on the raw data such that: primary testing results are retained in their raw form, and; further testing may be compared directly to raw data as well as to abstracted/prioritized data.

As described above, the framework 200 allows for software testing based on any number of mutated datasets. Thus, a developer may create machine learning model through the software development platform 208, and perform automated fuzz testing without necessitating research into particular forms of malicious input training data or other esoteric testing requirements. Furthermore, by leveraging an iterative or repetitive approach, target models may be repeatedly tested using a relatively large number of different input profiles, thereby increasing the likelihood that security vulnerabilities are identified prior to the model being rolled out publicly and/or execution of the model in a networked environment, such as the enterprise network 100.

Hereinafter, operations that may be performed by one or more components of FIG. 1 and FIG. 2 are described in more detail with reference to FIGS. 3-5.

Figure 3:
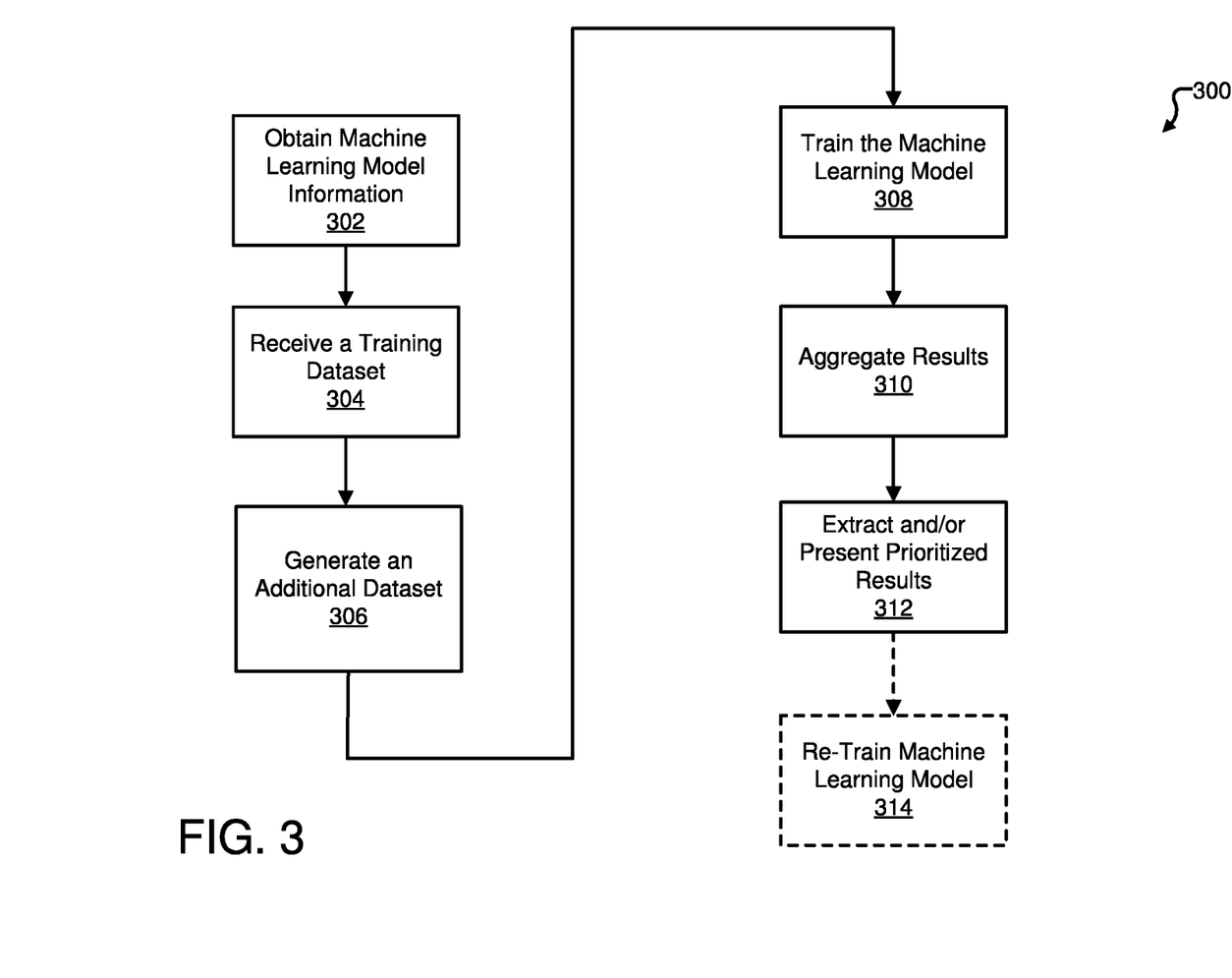
FIG. 3 is a flow diagram of an example method of fuzz testing of machine learning models, in accordance with some implementations.

FIG. 3 shows a flow chart of an example method 300 of fuzz testing of machine learning models. In general, various testing techniques are used to identify potential threats and vulnerabilities. For example, various mutated datasets may be generated and provided to train one or more machine learning models to identify vulnerabilities, and extract testing results. By filtering and prioritizing testing results with these tools, vulnerability mitigation actions can be performed and/or human intervention (e.g., debugging) can advantageously be directed toward contexts that are the most appropriate for a given set of prioritized results.

In some implementations, method 300 can be implemented, for example, on a server 106 described with reference to FIG. 1 and FIG. 2. In some implementations, some or all of the method 300 can be implemented on one or more client devices, on one or more developer devices, or on one or more server device(s), and/or on a combination of developer device(s), server device(s) and client device(s). In described examples, the implementing system includes one or more digital processors or processing circuitry ("processors"), and one or more storage devices (e.g., a data store 204 or other storage). In some implementations, different components of one or more servers and/or clients can perform different blocks or other parts of the method 300. In some examples, a first device is described as performing blocks of method 300. Some implementations can have one or more blocks of method 300 performed by one or more other devices (e.g., other client devices or server devices) that can send results or data to the first device.

In some implementations, the method 300, or portions of the method, can be initiated automatically by a system. In some implementations, the implementing system is a first device. For example, the method (or portions thereof) can be periodically performed, or performed based on one or more particular events or conditions, e.g., a number of exposed vulnerabilities being above a threshold, new categories of input datasets becoming available to the automatic fuzz framework, and/or one or more other conditions occurring which can be specified in settings read by the method.

Method 300 may begin at block 302. At block 302, a description of a target machine learning model is received. The machine learning model description may include a set of data used to identify features and aspects of a target machine learning model that is to be tested. For example, the machine learning model description may include machine learning model information such as a model type of the machine learning model (e.g., a neural network, a deep learning model, or other type). The machine learning model description may also include machine learning model information such as an output type of the machine learning model, e.g., clusters or classifications of different types of input, text labels (e.g., malicious/not malicious; trojan, virus, worm, backdoor, or adware; etc.). The machine learning model description may also include machine learning model information such as a type of malicious activity (e.g., system infection with a virus or worm; system attacked by a trojan; system access via a backdoor; installation or execution of adware; etc.) that the model is trained to detect. The method 300 continues at block 304.

In block 304, a training dataset is received. The training dataset may include a plurality of unlabeled examples for use in training and/or testing. In one implementation, the training dataset further includes a plurality of labeled examples. Each labeled example may be associated with a groundtruth label (or class, e.g., malicious/not malicious; trojan, virus, worm, backdoor, or adware; etc) and the accuracy of the generated labels can be evaluated based on a comparison of corresponding groundtruth labels for each labeled example. Additionally, the groundtruth label is not provided as input to the target machine learning model. Each example may include any suitable data from a computer system that is to be utilized to detect malicious activity. For example, such data may include executable code (running on or stored on the computer system); memory addresses accessed; data accessed (e.g., files stored on the computer system, system settings of the computer system, etc.); network activity (e.g., network addresses accessed; network protocols/ports utilized; etc.). The method 300 continues at block 306.

In block 306, an additional dataset (also referred to as poisoned dataset) is generated based on the training dataset, and by using a generative model. The additional dataset may include a plurality of additional unlabeled examples. According to one implementation, the additional dataset may be based on mutating one or more examples in the input dataset to provide fuzzing for the model. The additional dataset may include a noisy or uncurated dataset, an out-of-distribution dataset, and/or a concept-drift dataset. In some implementations, the additional dataset may include one or more examples that are noisy (e.g., mutated from the training dataset); statistically different from the training dataset (out-of-distribution, e.g., such that taken together, a statistical distribution of labels in the additional dataset is different from that of the training dataset); and/or simulate concept drift (e.g., include examples that the ML model classifies erroneously, simulating a change in the conditions experienced by the computer system). Concept drift may occur, for example, when a trained machine learning assigns a particular label to an example (e.g., virus) based on features of the example (e.g., executable code; memory used; data accessed; etc.) whereas the groundtruth label is different from the particular label. Data in the additional dataset does not need to be reviewed by a human rater or a different automated system to detect threats; it can be used without any labeling.

The poisoned dataset, generally, may be generated using a generative model, for example, a statistical and/or analytical model. The poisoned dataset may be generated as a "poisoned" version of the training dataset. Data poisoning is an aim to manipulate data in the training dataset to generate new examples that are used to train the model, to control the prediction behavior of the target model such that the model once trained, assigns labels to malicious examples into a desired class (e.g., labeling spam e-mails as safe, etc.).

In general, by poisoning only about 0.1% of the input training dataset, many machine learning models can be fooled to follow a desired activity of malicious attackers. Furthermore, at least three sources can be used to poison the input dataset, for example, by scraping a dataset from a public source, by harvesting system inputs, and/or by federated learning.

With regard to scraping a dataset from a public source, the dataset may be scraped from the Internet, with publicly available or permitted data. For example, data collection bots may be configured to extract content from the Internet. Furthermore, crowdsourced data and other data from third party services may also be used for scraping.

With regard to harvesting system inputs, various input data streams received by an organization may be consumed as sources for the poisoned data. For example, emails received by an organization and files uploaded to organization's portal can be consumed as sources for the mutated datasets, with appropriate permissions and in compliance with organizational data policies. These inputs could be poisoned routinely.

With regard to federated learning, data from a relatively large number of insecure user devices (accessed, obtained, and utilized with appropriate permissions) may be used to produce training data for the target model, with this data being relatively easily poisoned.

According to one implementation, the generative model may create a poisoned dataset through any of the above sources, and with an example formula labeled Equation 1, below:

$$p = \mathrm{argmin}_x \|f(x) - f(t)\|_2^2 + \beta \|x - b\|_2^2 \qquad \text{Equation 1}$$

In Equation 1, p' is the poison instance that is desired to be found in the additional dataset. Additionally, f(x) denotes the classifier function that propagates an input x through the final stages of the output (for example, a function to detect whether an email is a spam or no spam). Furthermore, b' is the base class also known as the original class associated with the target model. The right-most term ($\|x-b\|$) causes the poison instance 'p' to appear as an original class. Finally, parameter 'β' is the similarity degree.

It can be demonstrated that there exists an input sample 'x' that "collides" approximately very well with the target malicious class in feature space, while simultaneously being close to the original instance b' in input space. Thus, the first term of Equation 1 causes the poison instance to move toward the target instance in feature space and get embedded in the target class distribution.

Using this generated additional dataset, it is shown that if a machine learning model is re-trained on the "clean data+ poison instances" as in Equation 1, the linear decision boundary in feature space bends to label the poison instance as if it were in the original class. Upon generation of the additional dataset, the method 300 continues at block 308.

In block 308, the target model is trained to generate labels for each example in the training dataset and the additional dataset. For example, the target model is trained using a combination of the training dataset and the additional dataset, and the training includes adjusting one or more parameters of the machine learning model based on accuracy of the generated labels output by the target model. For example, if the machine learning model is implemented as a neural network, a weight of one or more nodes may adjusted and training may be continued with repeated adjustments. In some implementations, training may be stopped after the model reaches at least a threshold accuracy, until all examples in the training dataset and the additional dataset have been utilized, or upon exhausting a threshold level of computational resources. In one implementation, the training also includes training the machine learning model to classify an executable program as one or more of trojan, virus, worm, backdoor, or adware. The method 300 continues at block 310.

In block 310, results of the training based on the one or more input datasets are aggregated. In at least one implementation, the results are aggregated into a log (e.g., raw data log) for storage at the data store 204. The results may also be at least partially categorized, normalized, and/or prioritized through one of the components of the server 106 (e.g., with reference to FIG. 2). However, raw results may always be stored, in one implementation, such that these raw results may be used subsequently in analysis of fuzzer performance or for other purposes. In aggregating the results, the reporting service 222 may, for each dataset, receive results from the fuzzer and store the results in the log. The method 300 continues at block 312.

In block 312, prioritized results are extracted from aggregated results and presented. For example, the reporting service 222 may categorize exposed vulnerabilities into one or more categories. The one or more categories may be populated with testing results. These categorized results may further be normalized and prioritized. Additionally, the prioritized results are presented to the developer, for example, through a user interface. The prioritized results may be displayed as a listing or other graphical display. The graphical display may include interface elements allowing a developer to quickly identify vulnerabilities to aid in debugging, retraining, and/or other remediating efforts. The method 300 continues at block 314.

At block 314, the target model may be re-trained with one or more examples as additional inputs. For example, the one or more examples may be based upon new noisy or uncurated examples, out-of-distribution examples, and/or concept-drift examples.

As described above, various components of the system 100 and the automatic fuzzing framework 200 may be responsible for performing some or all of the blocks presented above with reference to FIG. 3. Hereinafter, a more detailed discussion of responsible components is presented with reference to FIG. 4, which mimics the overall data flow of method 300.

Figure 4:
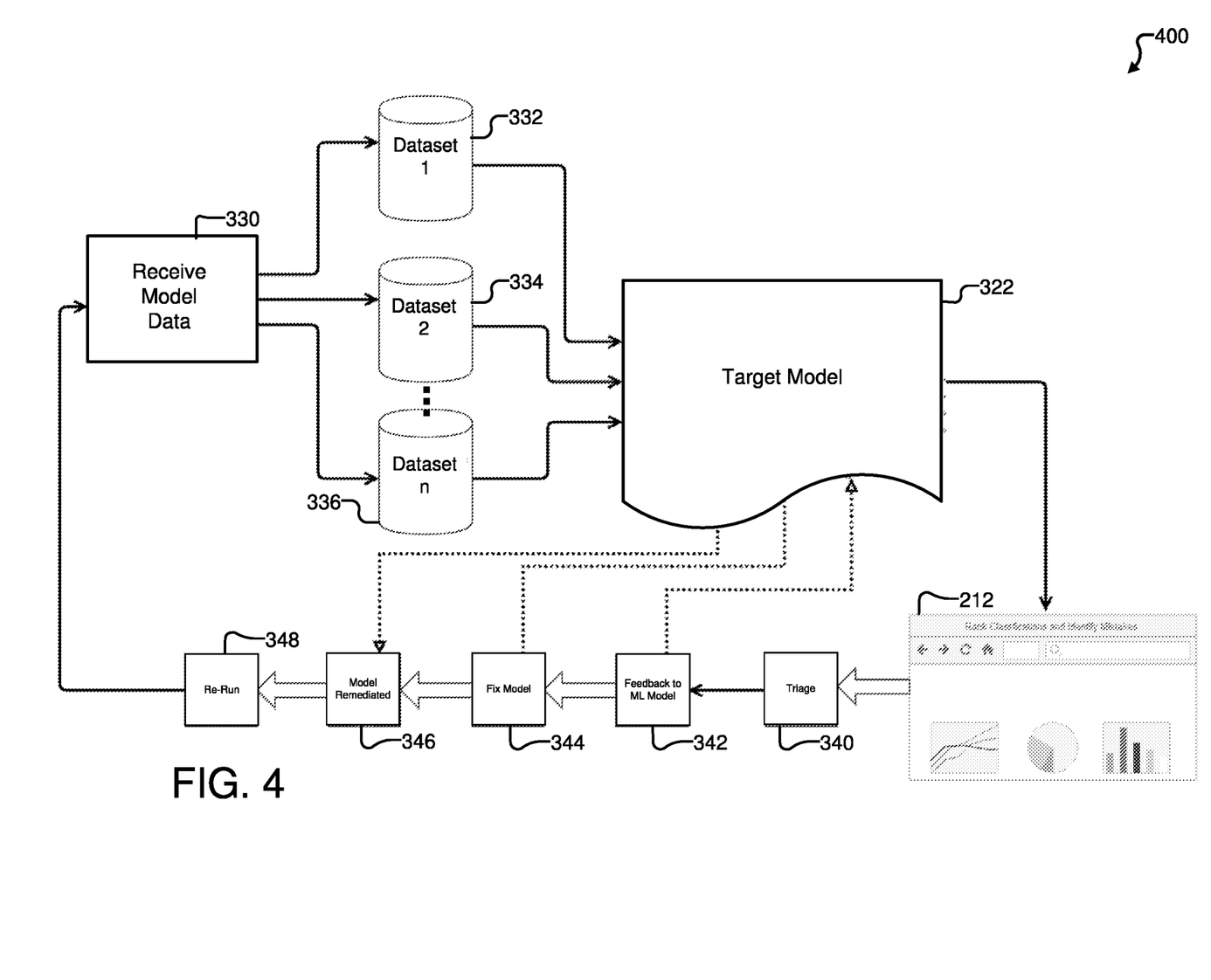
FIG. 4 is an alternate diagram of an example method of fuzz testing of machine learning models, in accordance with some implementations.

FIG. 4 is an alternate diagram of an example method 400 of fuzz testing of machine learning models, in accordance with some implementations. The method 400 may begin at block 330.

At block 330, the description of a target machine learning model 322 is received. The machine learning model description may be a set of data used to identify features and aspects of a target machine learning model that is to be tested. For example, the machine learning model description may include machine learning model information such as one or more of a model type of the machine learning model, an output type of the machine learning model, or a type of malicious activity that the model is trained to detect.

Upon receipt of the target model data at block 330, one or more mutated input datasets 332, 334, and/or 336 may be generated. The one or more mutated input datasets 332, 334, and/or 336 may then be provided as fuzzing inputs to the target model 322. Accordingly, the method 400 further includes fuzz testing of the target model 322 with one or more of the dataset 332, dataset 334, and/or dataset 336.

Dataset 332 may represent a noisy and uncurated dataset. For example, machine learning models that are used in cybersecurity to detect malware or phishing attacks are trained based on imperfect noisy and uncurated datasets. Due to resource limitations, it is impossible to manually label all datasets. Therefore, most models are trained from a mixed set of labeled and unlabeled training examples (known as "semi-supervised" learning). In fact, state-of-the-art models can reach within a few percentage points of "fully-supervised" training, while requiring 100× less labeled data (there indeed is a limited dataset to train such systems). As a result, this makes machine learning models (e.g., classifiers, kernel machines, anomaly detectors, etc.) vulnerable to backdoor and poisoning attacks. Generally, by poisoning just 0.005% of a dataset (e.g., just 150 of a 3 million dataset), the model can be caused to misclassify an input (e.g., label an email as a phish while it is not). Targeted poisoning attacks, whereby the model misclassifies a particular test input with an adversarially-desired label, are even easier requiring control of less than 0.0001% of the dataset (e.g., just two out of the 3 million sample emails).

In one implementation, dataset 332 includes maliciously crafted unlabeled examples totaling about 0.1% of the dataset size. The dataset 332 may include examples that manipulate a model trained on this poisoned dataset to misclassify arbitrary examples at test time (as any desired label).

Accordingly, the method 400 includes mutating one or more unlabeled examples of the training dataset using a generative model to create the dataset 332.

Dataset 334 may represent an out-of-distribution dataset. Training and testing distributions can differ and sometimes unknown datasets can emerge. For example, machine learning models "do not necessarily know what they do not know". This opens an attack surface for out-of-distribution (OOD) data exploits. A model trained for finding malicious classes can produce overconfident (with high variance) predictions for unknown classes.

Accordingly, the method 400 may include determining a statistical distribution of the training dataset, wherein the additional dataset (334) has a statistical distribution different than the statistical distribution of the training dataset.

Dataset 336 may represent a concept drift dataset. Concept drift poses a critical challenge to deploy machine learning models to solve practical security problems. Due to the dynamic behavior changes of attackers (that execute malicious code or otherwise engage in malicious activity on a computer system), over time, the testing data distribution is often shifting from the original training data, which causes major failures to the deployed model. To combat concept drift, drifting samples are detected that deviate from existing classes, and are used as a new class of input for fuzzing the target model.

Accordingly, the method 400 may include detecting the malicious activity using the trained ML model based on input examples from the computer system, wherein the trained model obtains a plurality of features from each input example and generates one or more labels for each input based on the plurality of features, detecting that a statistical distribution of the plurality of features of the input examples is different from a statistical distribution of the training dataset, wherein the detecting is based on the plurality of features obtained from each input example, and, in response to the detecting, retraining the model using one or more of the input examples as input.

Additionally, the method 400 can also include detecting the malicious activity using the trained ML model based on input examples from the computer system, detecting that a generated label associated with a subset of the input examples is different from a corresponding groundtruth label, and, in response to the detecting, retraining the model using subset of the input examples as input.

Additionally, utilizing the user interface 212 of the software development platform 208, a user (or automated technique) can view results of the fuzz testing and directed the method 400 to triage the machine learning model at block 340, provide additional feedback to the machine learning model at block 342, fix and/or adjust the machine learning model at block 344, determine that the target machine learning model is remediated at block 346, and/or re-run fuzz testing of one or more models at block 348. It is noted that each fuzz testing instance may provide one or more results that may be prioritized and/or displayed to a user or developer.

Hereinafter the display of the results in user interface 212 is described more fully with reference to FIG. 5.

Figure 5:
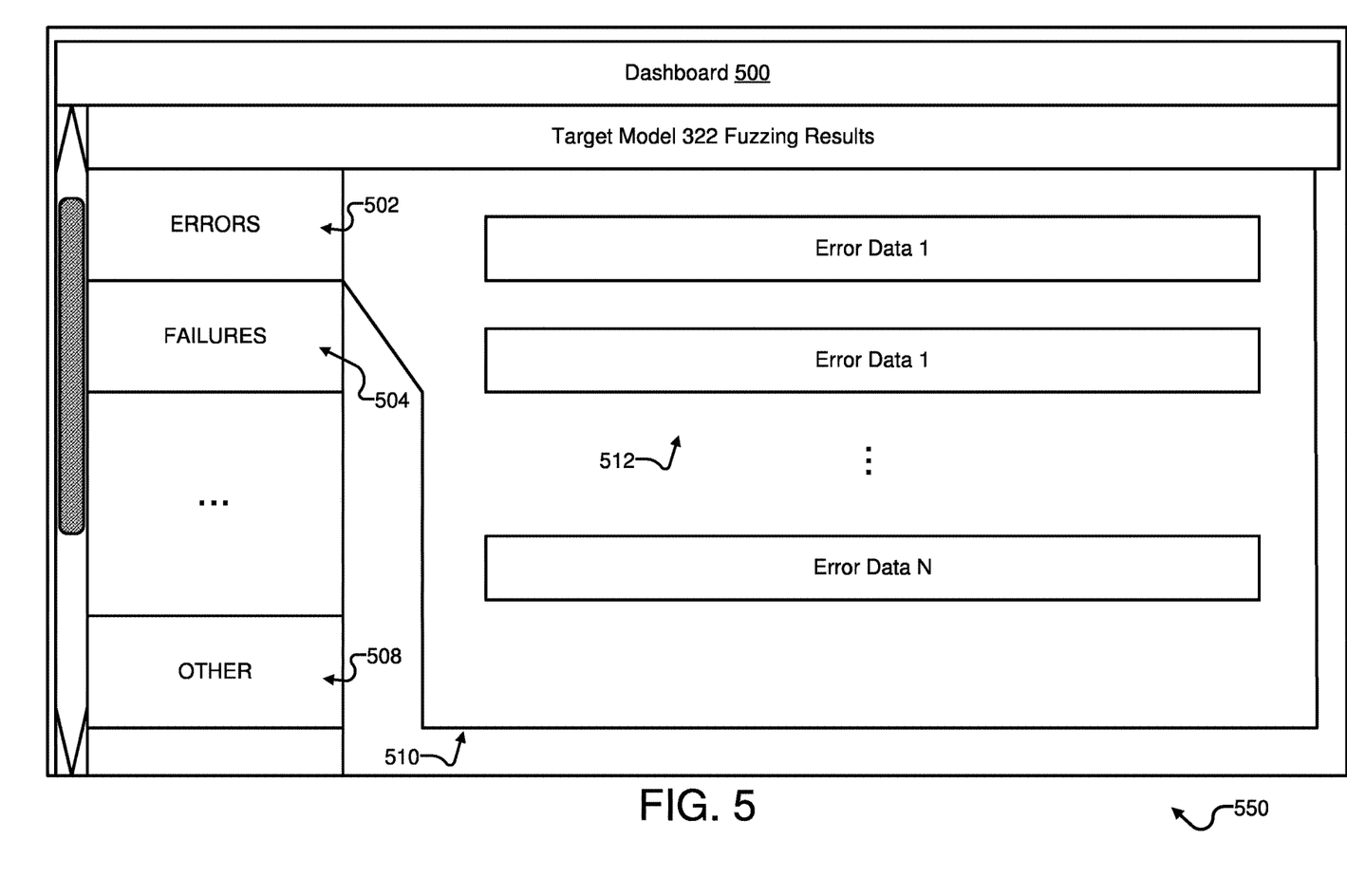
FIG. 5 is a diagram of an example user interface for presenting results of fuzz testing of machine learning models, in accordance with some implementations.

FIG. 5 is a diagram of an example user interface 550 for presenting prioritized results 412 and/or raw results 410 of automatic fuzz testing of machine learning models, in accordance with some implementations. The user interface 550 may be presented as a portion of the user interface 212, in some implementations. In other implementations, the user interface 550 may be a separate and/or unique interface provided by an automated testing framework such as the framework 200.

The interface 500 may include a main dashboard 500 that identifies target model 322's fuzzing results. The fuzzing results may be organized into one or more categories. For example, categories 502, 504, and 508 are provided as examples. It should be readily understood that these categorizes are examples only, and are not to be construed as limiting of every possible implementation. More or fewer categories, or different category descriptions are also applicable.

Each category 502-508 may be selectable by the user such that detailed categorized results 510 may be displayed. The detailed categorized results 510 may include prioritized data 512 that is a subset of raw data, that is a listing of software service tickets, that is a listing of vulnerabilities data, that is a listing of prioritized data, or that is any suitable listing of testing results. It should also be readily understood that other display and presentation techniques, including heat maps, graphical elements, links to ML inputs, and virtually any other format of display is applicable.

Using the interface 550, the user may identify the target model 322's vulnerabilities, and begin to perform model debugging in any appropriate manner such that these identified vulnerabilities are satisfactorily mitigated.

As described above, systems, methods, and various components are configured to implement an automatic fuzz testing framework. The framework for automatic fuzz testing of machine learning models may automatically generate one or more mutated input datasets for fuzzing of a target machine learning model. Through the teachings disclosed herein, fuzzing can automatically happen during training and development of a predictive model. The fuzzing may also be integrated during testing and deployment time of the model. Additionally, fuzzing can frequently attest the validity of a machine learning model to check effects such as concept-drift or other vulnerabilities based upon maliciously crafted input streams. Furthermore, it is apparent that as new adversarial schemes are born, the fuzz testing framework is scalable to adapt to test against new attack vectors with minimum development effort. Finally, the fuzz testing framework may continuously mutate input data to improve fuzzing of models, and to aid in hardening machine learning models against new attack vectors.

Hereinafter, a more detailed description of various computing devices that may be used to implement different devices (e.g., the server 106 and/or endpoints 102) illustrated in FIG. 1 and FIG. 2 is provided with reference to FIG. 6.

Figure 6:
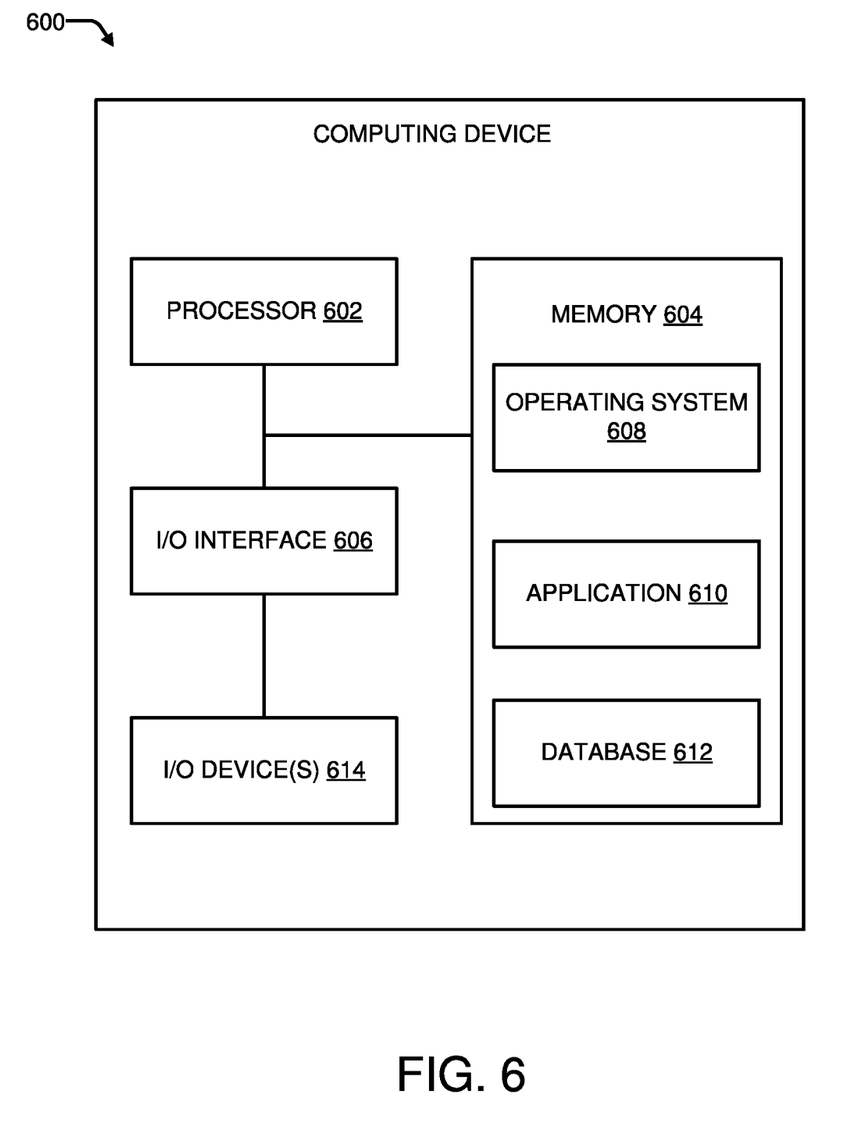
FIG. 6 is a block diagram illustrating an example computing device which may be used to implement one or more features described herein, in accordance with some implementations.

FIG. 6 is a block diagram of an example computing device 600 which may be used to implement one or more features described herein, in accordance with some implementations. In one example, device 600 may be used to implement a computer device, and perform appropriate method implementations described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 600 includes a processor 602, a memory 604, input/output (I/O) interface 606, and audio/video input/output devices 614 (e.g., display screen, touchscreen, display goggles or glasses, audio speakers, microphone, etc.).

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, an application or computer program product 610, and a database 612.

Memory 604 can include software instructions for executing the operations as described with reference to FIGS. 1-5. Any of software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 204), and input/output devices can communicate via interface 606. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 6 shows one block for each of processor 602, memory 604, I/O interface 606, software blocks 608, and 610, and database 612. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein.

A user device can also implement and/or be used with features described herein. Example user devices can be computer devices including some similar components as the device 600, e.g., processor(s) 602, memory 604, and I/O interface 606. An operating system, software and applications suitable for the client device can be provided in memory and used by the processor. The I/O interface for a user device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 614, for example, can be connected to (or included in) the device 600 to display images, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more user devices, servers, and threat management facilities. In some implementations, one or more methods described herein can be implemented, for example, on a server system with a dedicated threat management facility, automated fuzz testing framework, and/or on both a server system and any number of threat management facilities and testing frameworks. In some implementations, different components of one or more servers and or user devices can perform different blocks, operations, or other parts of the methods.

One or more methods described herein (e.g., method 300, 320, or 400) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to fuzz test a pre-trained machine learning model that is trained to detect malicious activity on a computer system, the method comprising:

obtaining information about the pre-trained machine learning (ML) model, wherein the information includes one or more of a model type of the pre-trained ML model, an output type of the pre-trained ML model, or a type of malicious activity that the pre-trained ML model is trained to detect;

receiving a training dataset, wherein the training dataset includes a plurality of unlabeled examples;

generating an additional dataset using a generative model, wherein:

the additional dataset includes a plurality of additional unlabeled examples generated based upon input of the training dataset to the generative model, the plurality of additional unlabeled examples includes one or more poisoned data instances that are from a dataset selected from a group of a noisy dataset that is generated by adding noise to one or more of the plurality of unlabeled examples, a concept-drift dataset, and combinations thereof, generating the additional dataset is performed such that the one or more poisoned data instances are embedded in a target class distribution in feature space of the pre-trained ML model, and the pre-trained ML model is trained to bend a linear decision boundary in the feature space to label the one or more poisoned data instances as non-malicious;

training, by a fuzz testing application, the pre-trained ML model to generate labels for each example in the training dataset and the additional dataset, using a combination of the training dataset and the additional dataset, wherein the training includes adjusting one or more parameters of the pre-trained ML model based on accuracy of the generated labels; and prioritizing, by the fuzz testing application, results of the training of the pre-trained ML model, the prioritized results including a listing of vulnerabilities of the pre-trained ML model to malicious input streams of data.

2. The computer-implemented method of claim 1, further comprising:

determining a statistical distribution of the training dataset; and determining a statistical distribution of the additional training dataset, wherein the statistical distribution of the additional training dataset is different from the statistical distribution of the training dataset.

3. The computer-implemented method of claim 1, wherein the training dataset further includes a plurality of labeled examples, each labeled example associated with a groundtruth label and the accuracy of the generated labels is evaluated based on a comparison of corresponding groundtruth labels for each labeled example, wherein the groundtruth label is not provided as input to the pre-trained ML model.

4. The computer-implemented method of claim 1, wherein the concept-drift dataset is generated by simulating a change in conditions experienced by the computer system to generate new examples and selecting one or more of the new examples that are erroneously classified by the pre-trained ML model for inclusion in the concept-drift dataset.

5. The computer-implemented method of claim 1, further comprising:

after the training, detecting the malicious activity using the pre-trained ML model based on input examples from the computer system, wherein the pre-trained ML model obtains a plurality of features from each input example and generates one or more labels for each input example based on the plurality of features;

detecting that a statistical distribution of the plurality of features of the input examples is different from a statistical distribution of the training dataset, wherein the detecting is based on the plurality of features obtained from each input example; and in response to the detecting that the statistical distribution is different, retraining the pre-trained ML model using one or more of the input examples as input.

6. The computer-implemented method of claim 1, further comprising:

after the training, detecting the malicious activity using the pre-trained ML model based on input examples from the computer system;

detecting that a generated label associated with a subset of the input examples is different from a corresponding groundtruth label; and in response to the detecting that the generated label is different, retraining the pre-trained ML model using the subset of the input examples as input.

7. The computer-implemented method of claim 1, wherein the plurality of unlabeled examples includes data from the computer system, wherein the data includes an executable program that runs on the computer system.

8. The computer-implemented method of claim 7, wherein training the pre-trained ML model to generate labels includes training the pre-trained ML model to classify the executable program as one or more of trojan, virus, worm, backdoor, or adware.

9. A computer program product comprising one or more non-transitory computer-readable media with instructions stored thereon that, responsive to execution by one or more processing devices, cause the one or more processing devices to perform operations comprising:

obtaining information about a pre-trained machine learning (ML) model configured to detect malicious activity on a computer system, wherein the information includes one or more of a model type of the pre-trained ML model, an output type of the pre-trained ML model, or a type of malicious activity that the pre-trained ML model is trained to detect;

receiving a training dataset, wherein the training dataset includes a plurality of unlabeled examples;

generating an additional dataset using a generative model, wherein:

the additional dataset includes a plurality of additional unlabeled examples generated based upon input of the training dataset to the generative model, the plurality of additional unlabeled examples includes one or more poisoned data instances that are from a dataset selected from a group of a noisy dataset that is generated by adding noise to one or more of the plurality of unlabeled examples, a concept-drift dataset, and combinations thereof, generating the additional dataset is performed such that the one or more poisoned data instances are embedded in a target class distribution in feature space of the pre-trained ML model, and the pre-trained ML model is trained to bend a linear decision boundary in the feature space to label the one or more poisoned data instances as non-malicious;

training, by a fuzz testing application, the pre-trained ML model to generate labels for each example in the training dataset and the additional dataset, using a combination of the training dataset and the additional dataset, wherein the training includes adjusting one or more parameters of the pre-trained ML model based on accuracy of the generated labels; and prioritizing, by the fuzz testing application, results of the training of the pre-trained ML model, the prioritized results including a listing of vulnerabilities of the pre-trained ML model to malicious input streams of data.

10. The computer program product of claim 9, wherein the operations further comprise:

determining a statistical distribution of the training dataset; and determining a statistical distribution of the additional training dataset, wherein the statistical distribution of the additional training dataset is different from the statistical distribution of the training dataset.

11. The computer program product of claim 9, wherein the training dataset further includes a plurality of labeled examples, each labeled example associated with a groundtruth label and the accuracy of the generated labels is evaluated based on a comparison of corresponding groundtruth labels for each labeled example, wherein the groundtruth label is not provided as input to the pre-trained ML model.

12. The computer program product of claim 9, wherein the concept-drift dataset is generated by simulating a change in conditions experienced by the computer system to generate new examples and selecting one or more of the new examples that are erroneously classified by the pre-trained ML model for inclusion in the concept-drift dataset.

13. The computer program product of claim 9, wherein the operations further comprise:

after the training, detecting the malicious activity using the pre-trained ML model based on input examples from the computer system, wherein the pre-trained ML model obtains a plurality of features from each input example and generates one or more labels for each input example based on the plurality of features;

detecting that a statistical distribution of the plurality of features of the input examples is different from a statistical distribution of the training dataset, wherein the detecting is based on the plurality of features obtained from each input example; and in response to the detecting that the statistical distribution is different, retraining the pre-trained ML model using one or more of the input examples as input.

14. The computer program product of claim 9, wherein the operations further comprise:

after the training, detecting the malicious activity using the pre-trained ML model based on input examples from the computer system;

detecting that a generated label associated with a subset of the input examples is different from a corresponding groundtruth label; and in response to the detecting that the generated label is different, retraining the pre-trained ML model using the subset of the input examples as input.

15. The computer program product of claim 9, wherein the plurality of unlabeled examples includes data from the computer system, wherein the data includes an executable program that runs on the computer system.

16. The computer program product of claim 15, wherein training the pre-trained ML model to generate labels includes training the pre-trained ML model to classify the executable program as one or more of trojan, virus, worm, backdoor, or adware.

17. A threat management computer system to manage security threats on an enterprise network, comprising:

a memory with instructions stored thereon;

one or more processing devices, coupled to the memory, the one or more processing devices configured to access the memory and execute the instructions; and one or more network devices coupled to the one or more processing devices and configured to receive requests issued by a plurality of client devices, wherein the instructions cause the one or more processing devices to perform operations including:

obtaining information about a pre-trained machine learning (ML) model configured to detect malicious activity on a second computer system associated with the enterprise network, wherein the information includes one or more of a model type of the pre-trained ML model, an output type of the pre-trained ML model, or a type of malicious activity that the pre-trained ML model is trained to detect;

receiving a training dataset, wherein the training dataset includes a plurality of unlabeled examples;

generating an additional dataset using a generative model, wherein:

the additional dataset includes a plurality of additional unlabeled examples generated based upon input of the training dataset to the generative model, the plurality of additional unlabeled examples includes one or more poisoned data instances that are from a dataset selected from a group of a noisy dataset that is generated by adding noise to one or more of the plurality of unlabeled examples, a concept-drift dataset, and combinations thereof, generating the additional dataset is performed such that the one or more poisoned data instances are embedded in a target class distribution in feature space of the pre-trained ML model, and the pre-trained ML model is trained to bend a linear decision boundary in the feature space to label the one or more poisoned data instances as non-malicious;

training, by a fuzz testing application, the pre-trained ML model to generate labels for each example in the training dataset and the additional dataset, using a combination of the training dataset and the additional dataset, wherein the training includes adjusting one or more parameters of the pre-trained ML model based on accuracy of the generated labels; and prioritizing, by the fuzz testing application, results of the training of the pre-trained ML model, the prioritized results including a listing of vulnerabilities of the pre-trained ML model to malicious input streams of data.

18. The threat management computer system of claim 17, wherein the operations further include:

determining a statistical distribution of the training dataset; and determining a statistical distribution of the additional training dataset, wherein the statistical distribution of the additional training dataset is different from the statistical distribution of the training dataset.

19. The threat management computer system of claim 17, wherein the training dataset further includes a plurality of labeled examples, each labeled example associated with a groundtruth label and the accuracy of the generated labels is evaluated based on a comparison of corresponding groundtruth labels for each labeled example, wherein the groundtruth label is not provided as input to the pre-trained ML model.

20. The threat management computer system of claim 17, wherein the concept-drift dataset is generated by simulating a change in conditions experienced by the computer system to generate new examples and selecting one or more of the new examples that are erroneously classified by the pre-trained ML model for inclusion in the concept-drift dataset.

* * * * *